Figure 1:
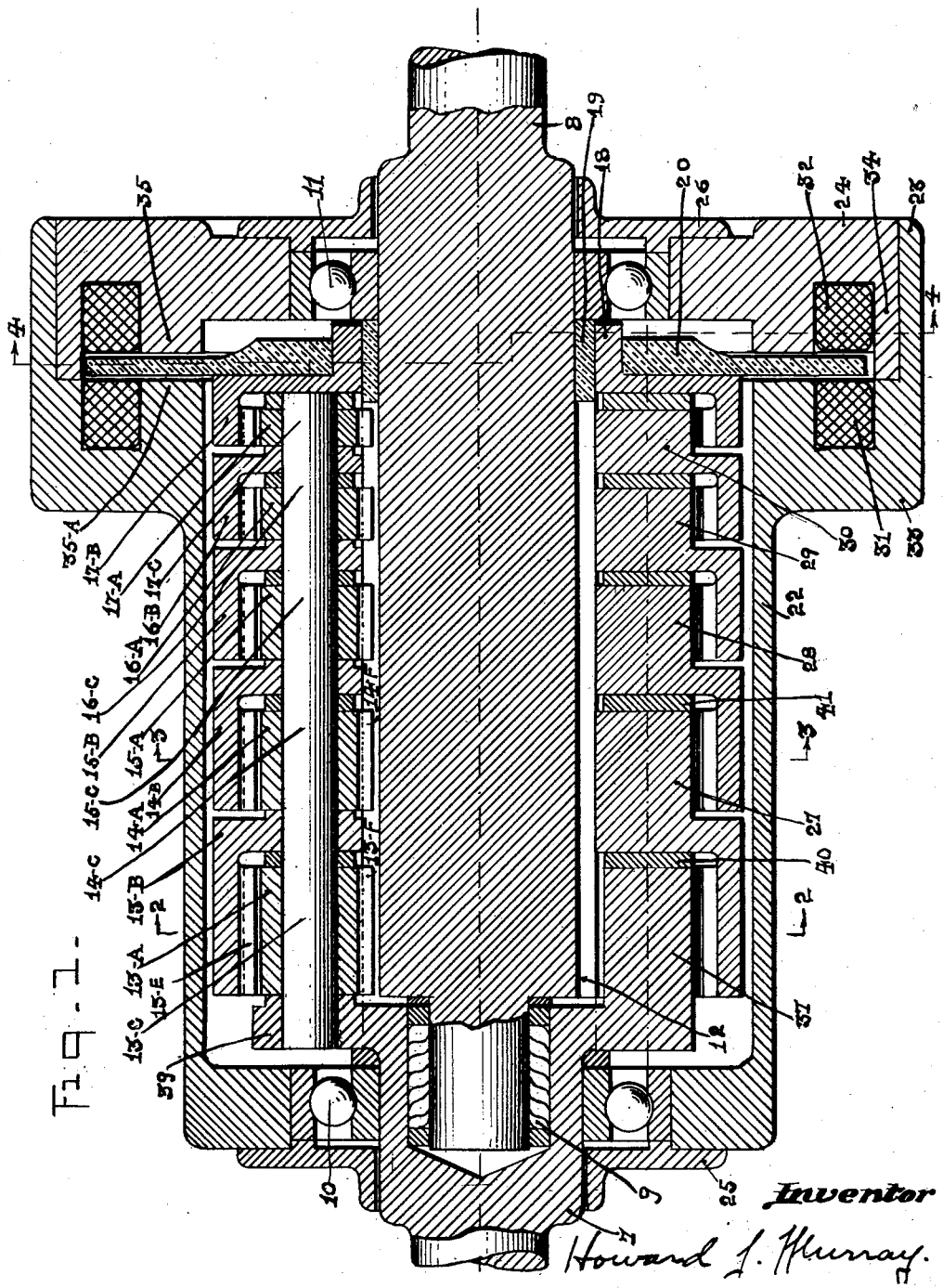

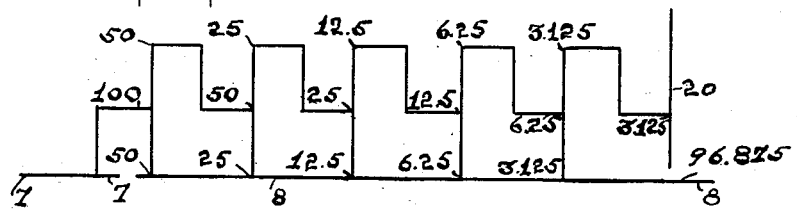
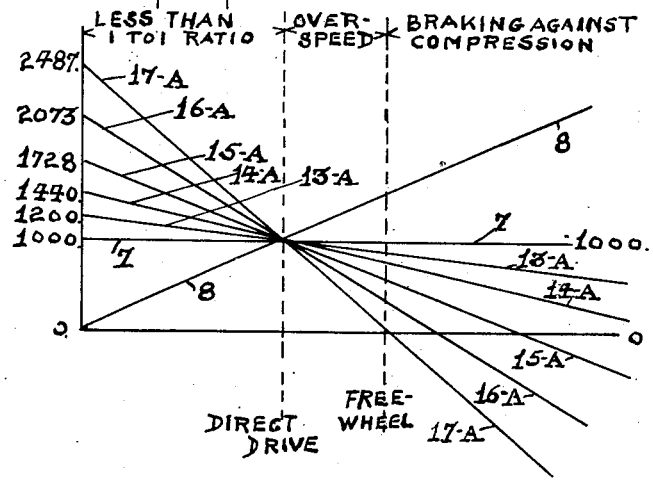
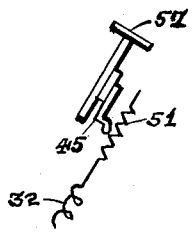
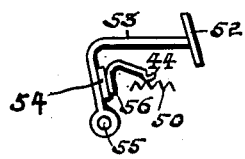
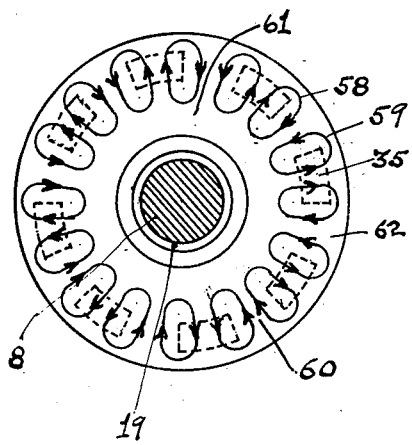
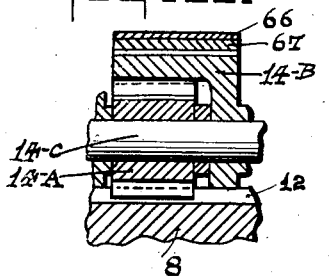
Inventor
Howard J. Murray.

Patented Mar. 21, 1939

2,150,983

UNITED STATES PATENT OFFICE 2,150,983

AUTOMATIC ELECTRIC VARIABLE SPEED BIDIRECTIONAL AND FREEWHEELING TRANSMISSION

Howard J. Murray, New York, N. Y.

Application May 23, 1935, Serial No. 23,040

12 Claims. (Cl. 172—239)

My invention relates in general to an automatic electric variable speed bidirectional and free-wheeling power transmission mechanism and specifically relates to a device for automatically effecting different bidirectional and free-wheeling speed relations between normally driving and normally driven members of an automotive vehicle transmission mechanism.

One of the objects of the present invention is to provide a simple form of power transmission mechanism designed so as to permit the employment of a small percentage of the total power to automatically control the bidirectional speed relations of the driving and driven members of the said transmission mechanism.

A still further object of the present invention is to effect by a comparatively weak or small electric control element the transmission of power from a driving member to a driven member under such conditions that the speed of the driven member may be automatically varied to assume a desired speed relation relative to the speed of the driven member.

An additional object of the present invention is to provide an electric power transmission control mechanism without any moving contacts whatever in the said control system.

A still additional object of the present invention is to provide means including in effect a non-friction clutching member designed to tend to hold certain members of a differential gear organization including a plurality of secondary differential sets so that its holding action may be in effect mechanically multiplied to control a plurality of holding actions on the said secondary sets thereby collectively causing the said transmission of power from the driving to the driven member.

In variable speed power transmission devices as known to the art frictional clutch surfaces, and also magnetic and mechanical clutches are employed to cause the desired driving and driven members to assume a desired speed relation. When friction clutching surfaces are used a great problem is presented to find suitable surfaces with the necessary high co-efficient of friction, and of material that will withstand the hard usage required and the resultant wearing due to the high co-efficient status. When surfaces of low co-efficient of friction are used prohibitive pressures are required for rapid braking action and inefficiencies exist.

With mechanical clutches such as the conventional overrunning type no design has been found that will not produce objectionable shocks when changing from one speed to another speed.

In the use of magnetic or electric clutches as heretofore known the necessary size and weight of the electric parts required are prohibitive, and the required speed relations between the driving and driven members are obtained at very low power transmision efficiencies.

According to the present disclosure a magnetic clutch is provided for use in effect as a non-friction holding means to create a plurality of holding actions at a plurality of portions of secondary differential gear sets together forming a part of an idler member of a main differential set including the normally driving member, the normally driven member, and the said idler member.

The said holding clutch includes a magnetic field producing means and an associated rotor or armature. In one embodiment of my invention the field producing means is fixed and the associated rotor attached to one of the secondary differential sets to rotate therewith. Thus rotation of the rotor through the produced magnetic field results in the generation of electric current which in turn results in a drag on the said differential, and this drag or holding effect is simultaneously transmitted to certain parts of all the differential sets so that a plurality of separate holding effects are created automatically with the creation of the said primary or electric holding effort.

This holding effort of the magnetic clutch couple is thus derived from the driving and/or driven members and transmitted in from one of the secondary differentials to the next so that a relatively small holding effort induced in the rotor is amplified in effect by controlling a plurality of holding efforts and thereby the transmission of a relatively great driving effort.

Thus it follows that the necessary size and weight of the electrical and magnetic parts required for the transmission of power at variable speed according to the present disclosure is only a small part of the size and weight of parts required in previously known electric transmission devices.

Applied to transmission mechanisms for movable vehicles the present device automatically secures a proper speed relation of the driving and driven members for every load resistance.

The present device may be designed to automatically secure approximately a direct drive relation between the driving and driven members, and in addition the control may be manually varied to secure this direct drive relation at different load resistances.

When the speed of the normally driven member exceeds the speed of the normally driving member the holding action of the non-friction clutch may be set so as to become relatively greatly decreased because of the decrease of the flux cutting speed of the rotor, and this flux cutting speed may approach zero speed and the holding action entirely disappear and thus a freewheeling status will exist between the driving and driven members.

As the speed of the normally driven member is increased over that of the normally driving member beyond the free-wheeling range the flux cutting action of the rotor will again become a holding factor to increase in proportion to the increase of the speed of the normally driven member over the speed of the normally driving member. This opposite speed action of the rotor is entirely automatic, and the holding action of the non-friction rotor positioned on one of the secondary differential sets will automatically again come into action and a braking bidirectional action will be derived from the action of the engine compression, and the use of this compression braking will increase proportionally as the normally driven member continues to increase its relative speed.

Still further the present disclosure contemplates the use of a manually actuated magnetic field producing control so that the intensity of flux cutting by the rotor and thus the automatic action of the non-friction clutch may be varied for a given set of conditions. For example, if the car is operated down a very steep grade so that the speed accelerates for a given normal set up of the non-friction clutch, it is obvious that a resistance may be varied by the hand so as to increase the current flowing in the field windings. This will increase the induced current and thus the holding action of the rotor, and in turn the speed relations of the driving and driven members so as to cause the engine to rotate relatively faster.

The automatic holding action of the rotor is of course a function of the strength of the magnetic field produced. The magnetic field strength in turn may be varied by a variation of the current sent through the field windings. This field current in turn may be varied by such well known means as a variable resistance. If a plurality of resistances are used, these resistances may in turn be varied by electrical, mechanical, or manual means, or a combination of all these means. In addition these resistances may be varied in combination with other controls used in the normal operation of the vehicle upon which the transmission is installed and operated. According to the present disclosure three of these resistances are provided. One to be installed preferably on the dash and designed to be operated by hand without regard to the movements of other parts of the vehicle, a second to be identified with the foot brake, and a third resistance co-operatively associated with the fuel control member of the vehicle.

In one physical embodiment of the present invention, I provide means to attain the transmission of power from a driving member to a driven member by connecting all the secondary differential sets forming a portion of the idler member with the normally driven member so that the rotor connected to one of these secondary differential sets will be rotated through a stationary magnetic field preferably in the direction of rotation of the normally driven member. Thus the secondary differential holding rotor will be rotated (say) clockwise at a relatively higher speed as the said driven member is rotated clockwise at a relatively lower speed. During the intervals of bidirectional drive conditions when the normally driven member becomes the driving member the hold-rotor will be rotated counter-clockwise as the driven member continues its clock-wise rotation.

While the present invention is obviously capable of use in any location where it is desired to receive power from a driving member at variable speed, the present invention is particularly applicable to an electrically controlled variable speed power transmission mechanism designed for use in connection with automobile construction, and it is in this connection that the embodiment of the invention will be described in detail.

Various other objects and advantages of the invention will be in part obvious from an inspection of the accompanying drawings and in part will be more fully set forth in the following particular description of one form of mechanism embodying the present invention, and the invention also consists in certain new and novel features of construction and combination of parts hereinafter set forth and claimed.

Figure 2:
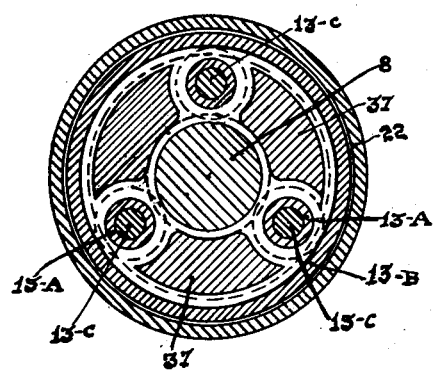
Figure 3:
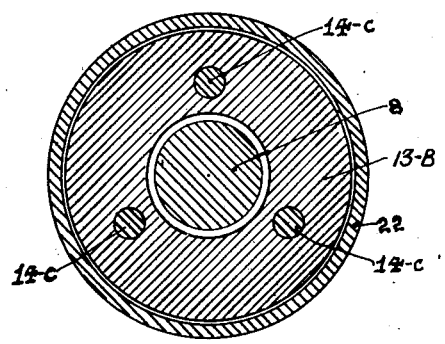
Figure 4:
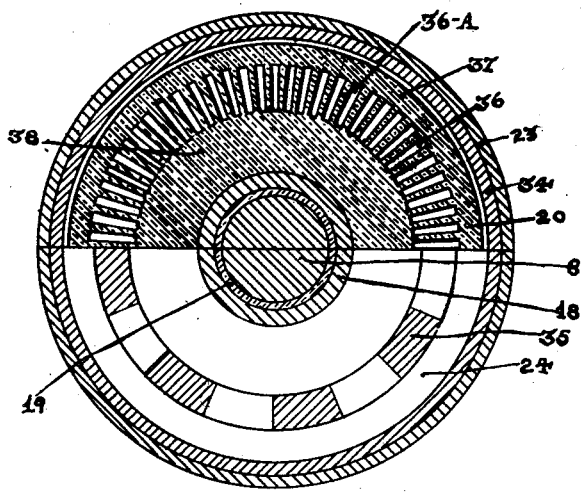
Figure 5:
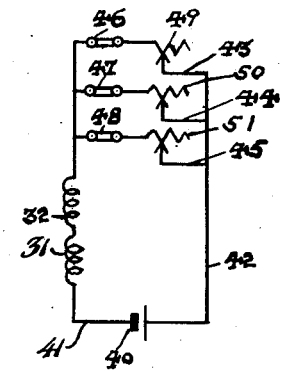

In the drawings:

Figure 1 is a physical embodiment of my invention in vertical section, taken axially of the main shaft; and Figure 2 is a transverse sectional view taken approximately upon the line 2—2 of Figure 1, looking in the direction indicated by the arrow; and Figure 3 is a transverse sectional view taken approximately upon the line 3—3 of Figure 1, and looking in the direction indicated by the arrows; and Figure 4 is a transverse sectional view of the electrically actuated speed control holding mechanism taken approximately upon the line 4—4 of Figure 1, and looking in the direction indicated by the arrows; and Figure 5 is a diagrammatic presentation of the electrical circuit and the necessary connections for operating the device embodying the present invention; and Figure 6 is a diagrammatic presentation of the division of effort through the various power transmission paths provided by the secondary differential sets during the transmission of power from one power member to the other; and Figure 7 is a diagrammatic presentation of the speed relations of the various members of the transmission mechanism; and Figure 8 is a partial view in elevation of the holding rotor showing the various paths taken by the resultant induced currents; and Figure 9 is a schematic view of one method of operating one of the field control resistances by the fuel control member of the vehicle; and Figure 10 is a schematic view of one method of operating one of the field control resistances by the brake pedal as commonly found on automobile vehicles; and Figure 11 is a sectional view in elevation of one method of employing mechanical brakes as a substitute for the electrical holding means.

In the following description and in the claims, parts will be identified by specific names for convenience of expression, but they are intended to be as generic in their application to similar parts as the art will permit.

There is shown in the drawings a novel dynamo electric machine and associated mechanical power transmission elements constituting an automatic electrically controlled variable speed bidirectional and free-wheeling transmission mechanism and including a pair of power shafts 7 and 8 disposed in axial alignment with their adjacent ends interfitted so as to provide proper space for the bearing 9.

The power shafts 7 and 8 are mounted for independent rotary movement respectively in suitable bearings 10 and 11 positioned and supported in the transmission casings 22 and 24. While either of these power shafts 7 and 8 may be considered as the driving or driven member of the transmission, for the purpose of this description, it will be considered that the shaft 7 is the normal driving member, and is operatively connected to be driven from a source of power such as an internal engine or other mover (not shown).

Accordingly, shaft 8 is regarded as the normally driven member, and is operatively connected to whatever mechanism (not shown) is designed to be driven from the mover.

The shaft 8 is formed with a plurality of splines or teeth 12 formed to operatively receive a plurality of groups of toothed gears forming together with the splines 12 a plurality of secondary differential gear sets of gears all mechanically connected in operative relation with the driving member 7 and the driven member 8 as hereinafter described.

The pinion gears 13—A, 14—A, 15—A, 16—A and 17—A are each supported on the teeth 12 by bearing shafts 13—C, 14—C, 15—C, 16—C and 17—C so as to be constantly in mesh with the teeth 12, and the gears 13—A in addition are positioned to rotate with the normally driving member 7. Unless otherwise specified the gears of all types shown in Figure 1 are preferably made of suitable steel, and the casings 22 and 24 are made of material such as iron suitable for magnetic circuits, altho the casings may be made of cast steel. The gears 13—B, 14—B, 15—B, 16—B and 17—B are internal gears having portions such as 27, 28, 29, and 30 rotatively fitted on the outer surface of the teeth 12 of the driven member 8. The gears 13—A, 14—A, 15—A, 16—A and 17—A are formed and positioned so as to mesh with the teeth 12 of the driven member 8.

The bearing portions of the internal gears 13—B, 14—B, 15—B, 16—B and 17—B receive the shafts 14—C, 15—C, 16—C and 17—C to position and support the said pinion gears. Thus the internal gear 13—B receives the shaft 14—C to support the gears 14—A. The internal gear 14—B receives the shafts 15—C to support the pinion gears 15—A, the internal gear 15—B receives the shafts 16—C to support the pinion gears 16—A. The internal gear 16—B receives the shafts 17—C to support the gears 17—A. The internal gear 17—B is mounted on the bronze bearing 19 in turn mounted on a reduced portion of the normally driven shaft 8.

With this arrangement it is evident the pinion gear 13—A is constantly in mesh with the teeth 12 of the normally driven member 8 and internal gear 13—B. Gear 14—A is constantly in mesh with teeth 12 and internal gear 14—B. Gear 15—A is constantly in mesh with the teeth 12 and internal gear 15—B. Gear 16—A is constantly in mesh with the teeth 12 and internal gear 16—B, and gear 17—A is constantly in mesh with the teeth 12 and the internal gear 17—B.

In passing it should be noted that the teeth 12 forming portions of the driven gear shaft 8 are in reality to be considered as gear teeth for the purpose of this description, and that the portions of the common teeth 12 meshing with the gears 13—A, 14—A, 15—A, 16—A and 17—A are portions of the secondary differential sets.

In this event it is obvious that power may be transmitted by and between the members 7 and 8 by a plurality of transmission paths, and that each of these paths will transmit power in some proportion to the retardation of the clock-wise rotation of the internal gears 13—B, 14—B, 15—B, 16—B and 17—B. It is also evident that any retardation of the clock-wise rotation of the internal gear 17—B will be transmitted to the other internal gears 13—B, 14—B, 15—B, and 16—B.

These paths may be identified as follows. A first named path includes shaft 7, shafts 13—C, gear 13—A and teeth 12 to shaft 8. A second named path includes shaft 7, shafts 13—C, gears 13—A, internal gear 13—B, shafts 14—C, gears 14—A, and teeth 12 to the normally driven shaft 8. A third named path includes shaft 7, shafts 13—C, gears 13—A, gear 13—B, shafts 14—C, gears 14—A, internal gear 14—B, shafts 15—C, gears 15—A, and teeth 12 to the shaft 8. A fourth named path includes shaft 7, shafts 13—C, gears 13—A, gear 13—B, shafts 14—C, gears 14—A, gears 14—B, shafts 15—C, gears 15—A, gears 15—B, shafts 16—C, gears 16—A, and teeth 12 to the shaft 8. A fifth named path includes shaft 7, shafts 13—C, gears 13—A, gear 13—B, shafts 14—C, gears 14—A, gear 14—B, shafts 15—C, gears 15—A, gear 15—B, shafts 16—C, gears 16—A, gear 16—B, shafts 17—C, gears 17—A, and teeth 12 to the shaft 8. Power is also transmitted by the gear 17—A to the gear 17—B and thus to the loosely mounted flange 18 upon which the rotor 20 is rigidly mounted to rotate therewith. This rotor is preferably made of copper or other material of low resistance value.

Thus there are six paths provided for the transmission of power from one of the power members 7 and 8 to the other. Path one is common to path two for a portion of its length. In the same manner path two is common to path three for a portion of its length and so on. All six paths are co-operatively associated, and any change in the status of one path will be immediately transmitted to the other paths. The speed relations of all the gears are fixed because they are constantly in mesh. In the same manner the speed of the rotor 20 is always a function of the speed relations of the gears, and conversely the speed relations of the gears is determined by the relative speed of the rotor. Any change in the relative speed of the rotor will cause a change in the speed status of the power members 7 and 8. If the rotor 20 is retarded by electrical or mechanical means it is obvious that the differential relations of the gears will be changed.

This holding rotor 20 is preferably formed with radial slots 36 as shown by Figure 4, and it is contemplated in some installations to cut these slots with oblique faces so as to create a slight pumping action so that any rotation of the rotor will result in a circulation of a cooling medium. The rotor 20 is positioned so as to rotate between the magnetic field pole pieces 35 and 35—A forming a portion of a magnetic path energized by current supplied by the source 40 of Figure 5 to the field producing windings 31 and 32. While I have shown the rotor as disc shaped it is obvious that it could have been cylindrical without affecting its operation as a holding element.

Any power transmitted from the gear 17—A to the gear 17—B will react according to the differential relation of these gears to tend to rotate the holding rotor 20 on the flange 18 mounted for rotary movement on the bronze bearing 19. The magnetic field path including a plurality of pole pieces 35 and 35—A is partially completed by path portions 33, 23, 24, and 34 assumed to be made of suitable magnetic material. In the present embodiment it is contemplated to form the transmission casing 22 and the portions 33 and 23 in one piece so as to save weight and at the same time secure a minimum field path reluctance. The portions 33 and 24 are formed with suitable recesses so as to properly receive the field windings 31 and 32. These field windings in the particular embodiment shown by Figure 1 are preferably ring-shaped and the magnetic flux produced in the windings will cause the pole pieces 35 to become (say) south poles and the pole pieces 35—A north poles. Thus the induced current created in the inductor portions 36—A of the rotor 20 will always flow radially outward, and radially inward between the pole pieces as shown by Figure 8.

In operation let it be assumed that the source of power is connected to the normally driving shaft 7 by means of any conventional clutch such as is commonly found on automotive vehicles, altho it is possible to operate a vehicle according to the present disclosure without any clutch between the source of power and the transmission.

Let it be further assumed for the purpose of this description that the source of power connected to the member 7 will rotate the same (say) clock-wise. The device to be operated and driven such as an automotive vehicle is assumed to be connected to the driven shaft 8, and the field windings 31 and 32 de-energized.

In this event the gears 13—A, 14—A, 15—A, 16—A and 17—A will revolve about their shafts 13—C, 14—C, 15—C, 16—C and 17—C as they are rotated about the still shaft 8 due to the meshing with the still teeth 12. The organization shown by Figure 1 will cause the gears 13—A, 14—A, 15—A, 16—A and 17—A to rotate clock-wise or in the same direction as the rotation of the normal driving member 7 except as hereinafter described.

It should be noted that there are more teeth on the internal gears 13—B, 14—B, 15—B, 16—B and 17—B than there are teeth 12 on the shaft 8. Consequently as the teeth 13—E of the internal gear 13—B mesh with the teeth of the gear 13—A and the teeth 12 are still, it is evident that the internal gear 13—B will be rotated about the shaft 8 at a faster rate of speed than the gears 13—A are rotated about the shaft 8 by the shaft 7. This increase of speed of the internal gear 13—B over the speed of the normally driving shaft 7 may be designated as the advancing speed, and the actual increase will be determined by the design of the secondary differential sets. It is evident that there is a wide range of possible advancing rates, and that this advancing rate may be different for individual differential sets.

This differential action may be more clearly seen by reference to Figure 2. The pinion shafts such as 13—C and the associated pinion gears 13—A meshing with the teeth 12 are shown positioned in openings in the body of the hub extension of the engine shaft 7, and the external gear 13—B is shown in mesh with the gears 13—A. In a similar manner the internal gears 14—B, 15—B, 16—B and 17—B are in mesh with differential gears 14—A, 15—A, 16—A and 17—A, and the teeth 12 of the shaft 8.

For the purpose of this description let it be assumed that the driving shaft 7 is rotating 1000 R. P. M. Let it further be assumed that the dimensional relations of the various differential gears are such that a complete revolution of the pinion gears 13—A meshing with the teeth 12 about the stationary power shaft 8 is such that one and one-fifth revolutions clock-wise will be given to the internal gear 13—B during the time that the gears 13—A make one complete revolution around the teeth 12. Thus the pinion gear 14—A connected to the internal gear 13—B to rotate therewith will be rotated 1200 R. P. M. about the stationary power shaft 8. It is obvious then that a similar speed increase will be given the internal gear 14—B over the 1200 R. P. M. speed of the pinion gear 14—A or a speed of 1440 R. P. M. In the same manner under these assumed conditions the internal gear 15—B will be rotated approximately 1728 R. P. M., the internal gear 16—B approximately 2073 R. P. M., and the internal gear 17—B approximately 2487 R. P. M.

Further consideration will show that a very small increase in the speed advancing ratio of internal gear 13—B by the gear 13—A will result in a comparatively great increase in the final speed of the internal gear 17—B.

Thus according to this disclosure it will be possible to provide means whereby the rotor 20 rigidly attached to the internal gear 17—B may be rotated clock-wise at a high rate of speed when the driving shaft 7 is rotating at the given speed of 1000 R. P. M. and the normally driven shaft 8 is stationary. During these conditions wherein the shaft 8 is stationary it is understood that the connected vehicle is of course stationary.

Now let it be assumed that it is desired to move the said vehicle by power transmitted from the shaft 7 to the shaft 8. In this event the operator closes the switch 46 (and/or the switches 47 and 48) of Figure 5 so as to permit current from the source 40 to flow through the field windings 31 and 32. This closing of the switch 46 may be accomplished by the hand or by the foot as a preliminary movement of pushing down the conventional gas throttle.

If the switch closing is accomplished manually the variable resistance 49 is adjusted as required for the normal operation of the vehicle. In this event the holding rotor 20 turning at approximately 2487 R. P. M. is driven through this magnetic field created by the current flowing through the field windings 31 and 32 and a current is induced in the radial inductor portions 36—A of the rotor 20 as shown by Figure 4. These radial portions are formed between the radial slots 36 which in actual construction may be very narrow.

This production of electric current in the inductor portions of the rotor 20 is accompanied by a drag or holding action on the said rotor and thereby on the clock-wise moving and revolving internal gear 17—B. The relatively high speed of the holding rotor relative to the stationary field flux produced by the windings 31 and 32 results in a high rate of flux cutting.

Altho the magnetic field may be provided in any form that will produce the necessary flux, the present disclosure employs a ring shaped winding so that all the pole pieces 35 are of the same polarity, and therefore all the pole pieces 35—A are of the same polarity. In this event the induced currents will all flow in the same direction when passing the poles, and in the opposite direction when flowing through the inductor portions 60 between the pole pieces as shown by Figure 8. It will be noted that sufficient conducting medium is given the rotor at the portions 61 and 62 to complete a closed circuit. Thus the currents 58 and 59 of Figure 8 are induced when the inductor portions 36—A pass under the poles 35 and combine to flow through the inductors between these poles. The action is the same at the remaining poles.

This novel construction of the holding control rotor 20 and the field paths permits the use of a very light copper or aluminum disc of the proper shape for high speeds. The rotor may also be provided without any laminations or other heavy mass usually found in armatures that would tend to limit the possible high speed of the said holding rotor.

Now the accompanying braking effect of inducing current in the rotor 20 will act to tend to slow down the clock-wise rotation of the internal gear 17—B and as a result a clock-wise driving force will be imparted to the teeth 12 of the shaft 8 by each of the gears 13—A, 14—A, 15—A, 16—A and 17—A as the secondary differential gears are slowed down by continued sufficient drag or braking effect of the rotor.

This clock-wise motion of the shaft 8 will occur in order to maintain the necessary differential relation of the various gears employed.

Let it now be assumed for the purpose of this description that the braking action of the holding rotor 20 has continued to retard the clock-wise rotation of the internal gear 17—B and the other differential gears in proportion until the clock-wise rotation of the normally driven shaft 8 has approached and equalled the speed of the driving shaft 7, and thus both the normally driving and normally driven shafts 7 and 8 are now rotating at the same speed or 1000 R. P. M. The rotor 20 will also be rotating at 1000 R. P. M. relative to the stationary field windings 31 and 32 in order to maintain its holding or controlling effect on the secondary differential sets and thus the control of power transmitted from one of the members 7 and 8 to the other. It should be noted that under such a condition all the gears shown by Figure 1 are rotating together and that such a condition in a vehicle transmission constitutes direct drive conditions. Under these conditions, all the rotatable parts of the power transmitting mechanism are rotating together with no relative movement. This is an ideal condition in any transmission mechanism, and especially when found in a vehicle transmission. This condition of no relative movement between the parts in effect is equivalent to a single integral mass, and means the elimination of wear during a very large percentage of its operation, and a very high possible efficiency because of the total elimination of friction loss between the parts. In conventional transmisssions there is always present the rotating parts of the countershaft during the direct drive intervals.

The variation of the various parts of the transmission during the interval from the time the field windings are energized until the time the shafts 7 and 8 are rotating at the same speed may be seen by reference to the diagrammatic presentation shown by Figure 6. The speed of the normally driving shaft 7 is shown by the line 7—7, and that of the normally driven shaft 8 by the line 8—8. As the holding effect of the rotor is created by the closing of the switch 46 of Figure 3 the speed of the internal gears 13—A, 14—A, 15—A, 16—A and 17—A will be decreased as shown on Figure 7 until the speeds are all the same as shown at the line (dotted) of direct drive. This condition of direct drive is taken as a condition of the purpose of disclosure because the parts have no relative movement, but are transmitting power, and thus may be more easily considered.

With the power shaft 7 driving the shaft 8 at the same speed through the five power transmitting paths hereinbefore described, the actual relation of these five paths will now be considered.

The apportionment of this power delivery through these five paths may be determined by mathematical investigation for a given design, but for the purpose of this description let it be roughly assumed under these conditions that equal torque is imparted by the gear 13—A to the internal gear 13—B and the teeth 12 of the shaft 8. Thus fifty percent of the power received from the driving member 7 is transmitted to the teeth 12 and the shaft 8 by the gear 13—A.

The remaining fifty percent of the power is transmitted to the shaft 14—C and thus to the opinion gear 14—A and thence divided between the internal gear 14—B and the teeth 12 of the member 8.

It follows then that 25% of the torque is transmitted to the gear 14—B, and 25% to the teeth 12 of the shaft 8. In the same manner torque is transmitted to the teeth 12 by the gears 15—A, 16—A and 17—A as follows, gears 15—A transmits roughly 12.5%, gears 16—A transmits roughly 6.25%, gears 17—A transmits roughly 3.125% and the remaining 3.125% is transmitted to the internal gear 17—B and thence to the holding rotor 20.

It is evident that under these conditions the rotor 20 must hold the internal gear 17—B to a speed of 1000 R. P. M. with the 3.125% torque in order to maintain the direct drive conditions under consideration. It follows then the roughly 3.125% of the total torque delivered by the driving member 7 is used to control the transmission of the said power to the normally driven member 8.

If another secondary differential set had been added to the showings of Figure 1 it is obvious that only 1.5625% of the torque would have to be created by the holding action of the rotor 20. It would be possible to add many more secondary differential sets, theoretically each additional set would correspondingly reduce the holding effort required by the rotor 20 to control the transmission of all the power, so that eventually an infinitesimal holding effort of the rotor 20 would be required to control the transmission of power at variable speed from one of the members 7 and 8 to the other member.

Now if the magnetic field strength is sufficient to tend to hold the internal gear 17—B so as to reduce its speed below the assumed speed of 1000 R. P. M. maintained on the driving member 7 then it follows that the differential relations of the gears will be maintained and the speed of the normally driven member 8 will consequently be increased above 1000 R. P. M. and a condition of overspeed drive relations will be effected in the transmission between the power members 7 and 8.

Reference again to the diagrammatic presentation of Figure 7 will make it more clearly understood how the overspeed relations of the members 7 and 8 are effected by a reduction of the rotor speed below 1000 R. P. M. to approach zero speed. As the speed of the holding rotor approaches zero speed the magnetic flux cutting rate is decreased and thus the holding ability of the rotor is decreased. When the rotor reaches zero speed there is no flux cutting and thus no rotor holding action, and a condition of free-wheeling exists between the power members 7 and 8. This is true, because while the conditions of zero speed of the rotor 20 is maintained no power may be transmitted from one of the power members 7 and 8 to the other. Under these conditions of free-wheeling the vehicle may be considered as coasting.

According to the present disclosure the proper speed relations between the power members 7 and 8 is automatically effected for a given load resistance, and in addition the degree of overspeed relations is also automatically limited. This will be obvious from an inspection of the speed curves of Figure 7, and with a constant field strength it will be apparent that the holding action under overspeed conditions will decrease with a tendency of increase of overspeed ratio. Consequently a condition will be reached when the rotor can no longer hold sufficiently to maintain the said overspeed increase, and thus the possible overspeed ratio is limited.

As the speed of the normally driven member 8 continues to increase beyond the condition of zero speed of the holding rotor 20, a condition of bidirectional power transmission is started and the rotor will now be rotated in a counter-clock-wise direction as the power shafts 7 and 8 still continue to rotate clock-wise with the driven (now driving) shaft 8 rotating the faster.

The holding rotor will now be rotated counter-clock-wise through the magnetic flux of the magnetic field and a holding current opposite in direction will now be generated to create a decrease of the counterclock-wise rotation of the rotor and thus cause the normally driven member 8 to now become the driving member and thereby drive the normally driving member 7. It should be noted at this time that the novelty of construction of the non-friction braking electrical couple including the field producing means and the rotor require no change or adjustment even though the current generated is in the opposite direction to that generated while member 7 is the driving member. In normal operation this bidirectional drive condition is desired to utilize the braking action of the engine compression in the use of the vehicle down grade. Reference to the curves of Figure 7 will show that some of the internal gears such as 17—A, 16—A, 15—A and 14—A will also reverse in direction of rotation if the speed of the normal driven member 8 is sufficiently increased over the speed of member 7.

If this reverse holding action of the rotor 20 is required to be greater than that normally required due to the normal increase of speed of the rotor the strength of the magnetic field may be increased manually by varying the value of the resistance element 49 of Figure 5 without regard to the relative speeds of the shafts 7 and 8, and thus the conditions under which direct drive, free-wheeling and bidirectional drive is effected will be changed. In case the resistance is decreased the arrival of direct drive and free-wheeling status will be accelerated. If the resistance is increased the arrival of direct drive and free-wheeling status and consequently bidirectional drive relations will be delayed. Thus the automatic action of the holding rotor 20 may be additionally affected by manual action to more nearly fit the required driving conditions.

This manual action of varying the field current resistance may also be accomplished by the brake foot pedal as can be seen by reference to Figure 10. It is noted that a brake pedal 52 connected to the conventional brake rod 55 by means of the brake lever 53 is also connected to the variable resistance 50 of Figure 5 so as to operate the wiper 44 when the brake pedal 52 is moved. Thus if the operator of the vehicle operates the brake pedal 52 the wiper 44 will be moved along the resistance 50 connected in the field winding circuit. If the resistance is decreased the field winding current will be increased and thus the magnetic field will be increased in density. In this event the current induced will be increased and the holding action of the rotor 20 will be greater and the speed ratio of the members 7 and 8 will be affected to approach a direct drive relation so as to approach a direct drive engine compression braking affect. When the movement of the brake pedal 52 moves to increase the resistance the braking action of the engine will be decreased, and thus the operator may vary the bidirectional drive action as a function of the normal braking with mechanical means without regard to the automatic action of the transmission, or in the case of an emergency both resistances 49 and 50 of Figure 5 may be varied. In normal operation the wiper 44 may be off the resistance 50 and moved into co-operative association with it as a preliminary action to the operation of the conventional brake, and the resistance 49 may be manually set for normal operation. In this event the variation of the field by the foot brake would only occur during intensional deceleration of the vehicle by the operator, and there would be no effect of the automatic action by this resistance 50 during the intervals of normal transmission of power from member 7 to member 8.

In Figure 5 there is shown a third resistance 51 which may be designated as the fuel control resistance. The variation of the holding action of the rotor 20 may also be obtained by the manual operation of the wiper 45 without regard to the status of the resistance 49. In Figure 9 this wiper 45 is shown attached to the fuel control throttle 57 by means forming an insulating block so that the operation of the throttle will move the wiper to bring about a variation of the resistance 51.

It is obvious that the wiper 45 may be adjusted to be out of contact with the resistance 51, and that it may be moved into contact with the same as a preliminary movement of the gas throttle 57.

While it is not contemplated that all three of the resistances 49, 50, and 51 will be varied at the same time, it is understood that the said resistances may be varied according to the operating conditions desired by the operator. At the same time, according to the present disclosure none of the resistance will be varied after a setting for normal driving conditions, except as a function of the operation of other controlling elements on the vehicle, such as the brake or gas throttle.

No reverse speed elements are shown in the drawings. It is assumed that no invention would be involved in providing a conventional reversing device positioned in the line of power transmission between the normally driven member 8 and the vehicle. Because of the very small percentage of the time a reverse drive is required, it is not essential as to where the control for same is placed, but it is suggested that the reverse control be placed at some convenient position on the dash.

By the means provided by this disclosure it is possible to start with the vehicle at rest and the driving shaft 7 rotating, and then bring up the driven shaft 8 to the speed of the normally driving shaft. The proper speed relations of the driving and driven shafts will be automatically obtained without any action on the part of the driver of the vehicle.

In addition over-speed relation of the driving and driven members will result automatically with acceleration of the vehicle. When the normally driven member 8 becomes the driving member, or tends to become the driving member a condition of free-wheeling (actual and approximately) will automatically result over a certain range of speed relations, and then a bidirectional transmission of power from the normally driven shaft 8 to the normally driving member 7 will take place. This automatic action in addition may be varied by hand or foot as a function of other vehicle controlling elements, or the automatic action may be varied by the operator without regard to the operation of other vehicle controlling elements such as the braking mechanism or the fuel control supply. Of course any of the resistances 49, 50, and 51 may be varied by any force sufficient to move the wipers 43, 44, and 45, but such operation as by centrifugal devices have been omitted in order not to complicate the drawings.

Thus the operator of the vehicle may obtain bidirectional and free-wheeling conditions to suit the driving conditions he may encounter in a given locality or for different weather conditions by simply varying the desired resistance or resistances by hand or foot. Or different drivers may desire different speed relations under the same driving conditions in a given locality or weather condition. In general the present disclosure includes a very flexible transmission mechanism which may be easily varied in its operation to suit the individual needs of the operator, or the vehicle itself.

The speed of 1000 R. P. M. assumed for the driving shaft 7 is based on a propeller speed of 50 revolutions per mile of vehicle speed per minute, and thus the speeds of the internal gears as given herein are taken as the vehicle moves at a speed of 20 M. P. H.

If a vehicle speed of 40 M. P. H. is desired for consideration the relative speeds may be obtained from a similar set of curves as shown on Figure 7. The driving shaft 7 of course may be given any possible speed, but the advancing rate of the internal gears 13—B, 14—B, 15—B, 16—B and 17—B really determines the relative speed of these internal gears for any given speed of the member 7. If the advancing rate is increased the resultant speed of gear 17—B and thus the rotor 20 will be increased and the sensitiveness of the control means will be increased. Because of the increased speed of the rotor for a given field strength the holding effort will increase with an increase in the advancing rate. Or, the field may be reduced for the same holding effort, and thus the weight of the magnetic field path will be reduced and the necessary field current reduced.

A wide range of advancing rates is available and will be a factor in any design of the mechanism for the conditions under which it will be installed and operated.

In addition it should be noted that the higher advancing rates will narrow the speed change between the direct drive and free-wheeling intervals, and will also cause the rotor to become more effective in braking action as the speed of the member 8 increases over the speed of the member 7. If the conventional clutch is used in conjunction with the present disclosure, it is evident that the rotor 20 may be provided to rotate at higher speeds than in vehicles wherein the present device is used without the said conventional clutch.

It should be noted at this time that there are at least four methods of arranging the secondary differential sets between the normally driving member 7 and the normally driven member 8. One of these methods of assembly is indicated by Figure 1 of the drawings. It should be obvious to those skilled in the arts that all of the secondary differential units, including for example, the set including the internal gear 13—B, shaft 14—C and the pinion gear 14—A could be removed from the shaft 8 turned 180° and reassembled on the said shaft so that the normally driving member 7 would then cause the pinion gear 14—A to rotate the internal gear 13—B. It should also be noted that the gear teeth 12 of the driven power shaft 8 could become the internal teeth of a common outer gear and the present gears 13—B, 14—B, 15—B, 16—B and 17—B of Figure 1 could become the bearing members supported by a shaft similar to a shaft 8 but without the teeth 12.

In other words, the secondary differential sets could be in effect reversed so as to be turned inside out relative to a showing on Figure 1 so that the present internal teeth 13—E, 14—E, 15—E, 16—E and 17—E would become external teeth.

As a further method of construction, these reversed differential sets could be turned 180 degrees after removal from the shaft 8 and then reassembled. Hence there are at least four possible arrangements of the said secondary differential sets collectively forming a portion of the idler member, all of these possible methods providing different speed-torque results for a given speed of the normally driving member 7. Only one of these possible secondary differential arrangements has been shown in order to avoid complicating the drawings but it is believed that these evident additional secondary differential arrangements should be obvious to those skilled in the art.

It should be noted in passing that these four methods of secondary differential assembly could be still further modified in that the diameters of the external gears 13—B, 14—B, 15—B, 16—B and 17—B could be provided with different gear diameters so that when assembled they would taper from right to left or vice versa. In this event, it would be possible to obtain a very wide range of possible speed-torque relations to suit the operative conditions under which the device may be installed and operated.

In Figure 11, there is shown a modification of one of the secondary differential sets of Figure 1 to include a mechanical brake. It is obvious that a mechanical brake may be used conjointly with, or as a substitute for, the electric holding means, provided by the rotor action and the magnetic field producing member. It is contemplated by the present disclosure that a machine may be organized whereby the electric holding action of the rotor 20 may be discontinued or thrown out of action and a mechanical brake brought into action to hold any one of the external gears of the secondary differential sets and thus secure selectively any one of several possible speed-torque positive drive relations between the power members 7 and 8. Or the change from the electric holding to the mechanical holding transmission of power under any one of these speed relations may be an automatic function of the speed of rotation of either or both of the members 7 and 8.

Consequently, there is shown in Figure 11 the external gear 14—B in co-operative association with a mechanical brake preferably of the band type including the band 66 and a suitable brake lining 67. In addition the normally driven shaft 8 with its teeth 12 is also shown in meshing relation with the pinion gear 14—A positioned by its shaft 14—C so as to properly mesh with the internal gear 14—B.

If the change from electric holding to mechanical holding by the means shown on Figure 11 is made when the speed of the selected internal gear such as 14—B is approximately at rest, there will be absolutely no shock or strain on the transmission mechanism, and a minimum loss due to friction on the selected mechanical brake. While only one internal gear such as 14—B is shown by Figure 11 as equipped with a mechanical brake, it is obvious that all of the internal gears of the secondary sets as shown on Figure 1 of the drawings such as 14—B, 15—B, 16—B and 17—B may be so equipped without departing from the spirit of the invention.

While I have shown and described and have pointed out in the annexed claims certain novel features of my invention, it will be understood that certain well known mechanical equivalents of the elements illustrated may be used, and that various other substitutions, omissions and changes in the form and details of the device illustrated and in its operation may be made by those skilled in the art without departing from the spirit of the invention which is indicated in the following claims.

Having thus described my invention, I claim:

1. A torque multiplying power actuated slip-clutch device for associating a driving member and a driven member of a vehicle provided with braking and power supply means, comprising co-operatively associated gear sets each connected to the driven member and to each adjacent set, one of said sets connected to the driving member and a second set provided with a restraining element energized by power derived from the driven member acting through the said sets, a source of electric power, variable magnetic means energized from the said source for controlling the restraining action of the element, and co-incidental manually actuated brake and power supply control means for separately varying the magnetic control whereby the variable speed driving relations of the members will bidirectionally become a function of the combined affect of the resistance of the driven member, the speed of the driving member and the selective co-incidentally controlled intensity of the said restraint.

2. A torque amplifying device for affecting the speed driving relation of driving and driven members of a vehicle provided with braking and fuel supply means, including speed driving units axially disposed between said members, a slip-drive couple including a slip-clutch armature element mounted for rotation with one unit a fixed field element, an end unit connected to one member, and all units connected to each adjacent unit and the other member, control means associated with the fixed slip-clutch element, and a plurality of current control means operatively associated with the said vehicle brake and fuel supply means for co-incidentally varying the action of the control means as separate co-incidental functions of the operation of the fuel supply means or the braking means of the vehicle.

3. A control amplifying device for automatically effecting speed drive relations between a driving member and a driven member of a vehicle provided with brake and power supply control means, comprising slip-drive gear sets axially arranged in a compound multiple series driving relation, a source of current and an electro-magnetic slip-clutch couple associated with the said source of current and said sets and arranged to derive power from the said driving member to initiate the said slip-drive action, means for separately and co-incidentally associating the couple with the said brake and power supply control, said slip-drive action thereafter variably maintained as a function of the variable speed of the driving member, the individual and combined operation of the brake and power supply controls and the variable driving resistance of the driven member, said maintaining power required decreasing with increase in the number of sets between the said couple and said driving member.

4. The combination in a vehicle power transmission including a pair of shafts, differential speed driving sets each in speed driving relation with one of the shafts and with each neighboring set, one set in driving relation with the other shaft for establishing a drive between the shafts, of control means including a source of current for automatically establishing a desired speed relation between the shafts as the drive is effected, said control means comprising a dynamo-electric clutch including a fixed field producing means energized from the said source and a rotatable armature portion energized by power received from the said shafts through the said sets, and a plurality of manually operable co-incidental vehicle fuel supply and brake means for separately controlling the current supply to the field producing means and thereby causing the clutch to become effective, said control means being operable incidental to the rotation of the shafts to additionally augment the intensity of the action of the clutch independently of the control action of the field producing means on the said armature.

5. A control amplifying slip-clutch organization for associating a driving member with a driven member of a vehicle equipped with brake and power supply control means, comprising differential drive sets axially disposed between the said members, a slip-clutch couple including a stationary field producing element and an armature element arranged for rotation with one of the sets, a plurality of separate means co-incidentally associated with the said brake and power supply control means for co-incidentally varying the strength of the produced field and thereby the holding effect of said field on the rotatable element thereby to cause same to variably derive power from the driving member through all the said sets therewith to effect variable speed bidirectional driving relations between the said members as separate and combined co-incidental functions of the operation of the brake and/or the power supply control means.

6. In a vehicle power transmission, the combination of a pair of power members, a resistance member including elements providing power paths between the members in multiple series relation for permitting the power members to drive one from the other through the said paths according to the load torque of the driven member and the speed of the driving member, co-incidental vehicle fuel and brake control means for inaugurating the action of the resistant member and varying the speed of the driving member, and dynamo-electric means associated with the resistant member and the said control means for co-incidentally operating the vehicle and also causing the resistant member to continue to function to transmit power from one member to the other due to control power derived from one of the members.

7. In a device of the class described, the combination of two vehicle power members mounted for independent rotary movement, mechanism including differential speed driving sets each in speed driving relation with one of the members and with each other, one set in driving relation with the other member for driving one from the other, dynamo-electric means energized due to the rotary movement of the power members for deriving control power from same for automatically causing said driving mechanism to become operative to transmit power from one member to the other, a source of current, a plurality of circuit closers each associated with a variable resistance and a plurality of co-incidental vehicle fuel and brake controls for actuating the closers and the resistances causing the said dynamo-electric means to be placed in a variable slip-clutch condition as a co-incidental function of the selective manual actuation of the said controls in the operation of the vehicle.

8. In a vehicle power transmission, the combination of two members adapted to assume an interdriving relation, and dynamo-electric slip-drive means including speed driving sets each in driving relation with one of the members and with each other, one set in driving relation with the other member for deriving power from one of the members causing the members to co-incidentally and automatically assume universal speed driving relations, a source of current, a fuel control actuated circuit closer, a brake control actuated circuit closer said means normally controlled in its slip-drive action as a function of the relative speeds of the members and additionally controlled according to the status of the fuel and brake control elements of the said vehicle.

9. A slip-drive device for connecting a vehicle driving member and a vehicle driven member in speed drive relations, including gear sets arranged to provide progressively divisible power paths, a dynamo-electric slip-drive couple including a rotatable element and a stationary element constituting the last path division and arranged for deriving control power from one of the members according to the number of the said path divisions, means operable with the vehicle fuel supply control means for initiating and varying the power deriving action of the said couple, and other means separately operable with the brake control means of the vehicle for varying the power deriving action of the said couple as the first named control means remains inoperative.

10. A control amplifying slip-clutch device for coupling a driving member with a driven member of a vehicle equipped with brake and power supply control means, a comprising a plurality of normally unrestrained differential drive organizations each in a driving relation with the driven member and with adjacent organizations, one organization in driving relation with the driving member, and means co-incidentally controlled by the selective operation of the said brake and power supply control means for deriving power from one of the members for rendering one of the said organizations partially restrained and therethrough all of the other said organizations restrained to a greater degree thereby to differentially effect the transmission of power from one member to the other as a co-incidental function of the selective operation of the said brake and power supply control means during the normal operation of the vehicle.

11. A variable speed power transmission mechanism including a driving member and a driven member provided with brake and power supply control means and a control amplifying resistant member between said members, said resistant member including dynamo-electric means for initiating the said control action, and a plurality of differential gear sets for amplifying the effect of the said control power when initiated, said sets arranged in a series multiple relation so as to provide series multiple power paths for the transmission of power between said members, each set connected to the driven member and to adjacent sets, one set connected to the driving member, and circuit means co-incidentally associated with the brake and power supply control means for associating the initiating means with one of the sets so as to receive the control power to be amplified by the said sets from one of the members thereby to effect the differential transmission of power from one member to the other through the said paths as a founction of the operation of the said brake and power supply controls during the operation of the vehicle.

12. A torque amplifying slip-clutch device for connecting driving and driven members of a vehicle equipped with power supply and brake control means in driving relation, including a dynamo-electric couple operatively associated with the said controls and arranged for deriving transmission control power from one of the said members as a co-incidental function of the operation of the said power supply and brake controls, and differential transmission sets positioned between said members and arranged to act to amplify said control power, said sets constituting means providing progressively divisible power transmitting paths between said members.

HOWARD J. MURRAY.